3,711,431
METHOD OF MANUFACTURING LIGHTWEIGHT BUILDING COMPONENTS

Silvio Vargiu, Osvaldo Spelta, Sesto S. Giovanni, and Pierluigi Abruzzi, Bergamo, Italy, assignors to Società Italiana Resine S.p.A., Milan, Italy
No Drawing. Filed Dec. 22, 1971, Ser. No. 211,057
Claims priority, application Italy, Dec. 23, 1970,
33,464/70
Int. Cl. C08v 1/30
U.S. Cl. 260—2.5 B          10 Claims

ABSTRACT OF THE DISCLOSURE

Lightweight building elements are made from cement, water and vinyl resin latex homogenised with granular expanded polystyrene pretreated with an aqueous dispersion of an epoxy glue and organic solvent and a hardener.

---

The present invention relates to improvements in the methods of producing lightweight building elements, more precisely it relates to manufactured items for building, which comprise a hydraulic binder and an expanded plastics material.

Various types of light weight building materials known usually as "lightweight concretes" are known in the art, such as for example those which have an inherent porosity (foamy structure) and those which are obtained by incorporating lightweight substances.

Of the latter, manufactured materials with a density equal to or less than approx. 0.8 kg./per cu. dm. which comprise a hydraulic binder and expanded polystyrene, have excited particular interest. These products, which find application in the field of lightweight prefabrication, are obtained by hardening mixtures comprising cement, water and expanded polystyrene in granular form.

It is also known to use adhesive substances in the production of lightweight concretes.

Normally used adhesives are compounds of condensation between epichlorohydrin and polyvalent alcohols or polyhydric phenols, known in the art as polyepoxides.

In particular, the particles of expanded polystyrene are treated with an aqueous dispersion of the polyepoxide before mixing with the hydraulic binder and the resultant mixtures are subjected to hardening.

This procedure is not without its drawbacks. In particular, the mixtures described have excessively high setting times so that in practice, long working cycles with obvious economic disadvantages are involved.

In addition, the mixtures comprising the hydraulic binder and the pretreated polystyrene particles have relatively poor workability characteristics; in particular, they are difficult to homogenise.

As a result, the corresponding articles, when set, often have non-uniform mechanical properties.

A method has now been found of producing lightweight building elements which comprise a hydraulic binder and granular expanded polystyrene, which makes it possible to avoid the drawbacks described and to obtain perfectly uniform products with high mechanical properties.

The method of the present invention consists essentially in subjecting to setting mixtures obtained by homogenising granular expanded polystyrene with the hydraulic binder, the said binder having been treated beforehand by means of a vinyl resin latex.

More precisely, according to the method of the present invention, a mixture is prepared which consists of a hydraulic binder, the vinyl resin latex and water in quantities required for preparation of the finished article.

This mixture is then homogenised with granular expanded polystyrene which is first treated with an aqueous dispersion comprising an epoxy glue together with an organic solvent.

Finally, the homogenised mixture is set. According to the method of the present invention, the hydraulic binder is treated with a vinyl resin latex before homogenisation with the expanded polystyrene. The term vinyl resins refers to vinyl acetate polymers, vinyl acetate copolymers with acrylic or methacrylic acid esters, and copolymers of styrene with the esters of acrylic or methacrylic acids.

Such polymers or copolymers are used in the form of a latex, in other words in the form of those stable aqueous dispersions which are obtained directly by polymerising monomers, and which have a solids content of 40 to 55% by weight.

The latices of copolymers of styrene with methyl and ethyl esters of acrylic and methacrylic acids have been found particularly useful for the purpose.

As hydraulic binders, it is possible to use standard cement of the type known as 325, high strength cements (type 425), high strength and rapid setting cements (type 525) aluminous cement (type 525) and cements as used for dams (type 225).

According to the method of the present invention, a mixture is prepared incorporating such cements, water and the aforedefined vinyl latices.

In particular, the mixture preferably uses a quantity of the latex from 1 to 5% by weight with respect to the cement, to obtain appreciable advantage with satisfactory setting.

The quantity of water in the mixture varies according to the quantity of cement. Generally, the best results are obtained with proportions by weight of water to cement ranging from 0.4:1 to 0.5:1.

According to the method of the present invention, the mixture is homogenised with granular expanded polystyrene which has been previously treated with an aqueous dispersion comprising an epoxy glue in addition to an organic solvent.

More particularly, polystyrene is preferably used in the form of granules of a diameter up to 3 mm., with closed cells, of an apparent density in bulk of 16 to 28 kg./cu. m. approx.

In the treatment of such polystyrene, epoxy glues are used which are defined as the products of condensation of epichlorohydrin with polyvalent alcohols or polyhydric phenols, and in particular those liquid products which are obtained by condensation of epichlorohydrin with diphenol with an epoxide equivalent of 180 to 220 and ranging in viscosity from 6,000 to 25,000 cps. In the preferred embodiment, glues are used which consist of mixtures of polyepoxide compounds and alkyl glycidyl ethers or aryl glycidyl ethers.

It has been found that the best results are obtained with ratios by weight of polyepoxide compound to monoepoxide compound ranging from 0.3:1 to 1:1.

Such glues are used in the form of aqueous dispersion and in quantities of 1 to 8 kg./cu. m. of expanded polystyrene.

According to the method of the present invention, the aqueous dispersion of the glue preferably also contains an organic solvent chosen from the group consisting of aliphatic or aromatic hydrocarbons, benzene, toluene and the xylenes being preferred.

Such solvents are preferably used in quantities of 0.1 to 4.0 kg. for every cu. m. of polystyrene particles, to obtain appreciable advantage without undesirable phenomena of dissolution of the polystyrene particles.

According to the method of the present invention, the aqueous dispersions of organic solvent and epoxy glue contain one or more hardeners for the epoxide compound.

Such hardeners are suitably chosen from among those normally known in the art such as for example methane diamine, triethylene tetramine and phenyl glycidyl ether and tetraethylene pentamine-based adducts, and are preferably used in quantities ranging from 10 to 30 parts by weight to every 100 parts by weight of epoxide compounds.

The aqueous dispersion is moreover preferably obtained with the aid of substances of the tensioactive type such as for example aryl sulphonates, alkyl aryl sulphonates, the products of condensation of ethylene oxide with phenols or alkyl phenols and the sulphonated alcohols such as sodium lauryl sulphonate. It has been found that the best results are obtained by homogenising the epoxide compound, containing the hardener, with a tensioactive agent or preferably a mixture of several tensioactive agents dispersed in a little water and by adding to the mixture obtained, while this is kept under brisk agitation, a further quantity of water and the chosen organic solvent.

In this way, aqueous dispersions are obtained which remain stable for several hours and which can be used in the treatment of expanded polystyrene particles.

In the formation of the mixtures which are to be subjected to hardening, the proportion by weight of cement to polystyrene is regulated as a function of the density of the manufactured product which it is intended to obtain, such a density ranging from 0.2 to 0.8 kg./cu. dm.

Such mixtures may be set at room temperature or at higher temperatures, and in the preparation of manufactured items for building, the mixtures may be poured into suitable moulds or may be extruded in machines suitable for the purpose.

By working according to the method of the present invention, manufactured items are obtained which have improved mechanical properties with respect to those which can be obtained by the methods known in the prior art.

Such manufactured items furthermore have optimum properties of heat and sound insulation, a low moisture absorption level, and ready workability by machines normally used in building.

One advantage of the method of the present invention consists in the rapid setting of the mixtures comprising a hydraulic binder and expanded granular polystyrene. Setting is more rapid than when treating the granular polystyrene with aqueous suspensions of polyepoxides or other glues, such as occurs in prior art processes.

One drawback which is found in the prior art resides in the difficulty of homogenising substances of such different specific weight as expanded polystyrene and the hydraulic binder.

By treating the hydraulic binder with the vinyl latex and by treating the expanded polystyrene particles with the aqueous dispersions of the epoxy glue and the organic solvent, rapid and reliable homogenisation is achieved in the mixtures which are subjected to hardening. It is considered that this fact contributes towards the improved mechanical characteristics of the finished products, to which reference has already been made.

It should be noted that these improved characteristic features are obtained according to the method of the present invention by the use of very small quantities of epoxy glues, in any case such glues are used in smaller quantities than in the prior art processes.

In the following experimental examples, the homogeneous mixtures comprising cement, water and expanded polystyrene are prepared and hardened.

In particular, the dispersion of epoxy glue and expanded polystyrene particles is poured into a polyethylene receptacle with the help of steel spatulas, the result being blended again for a few minutes.

The cement, water and vinyl latex are poured into another receptacle and mixed together for a few minutes.

Finally, the two mixtures are homogenised by one being poured into the other indiscriminately or vice versa, the result being mixed for a few minutes until an homogenous mixture is formed.

Test specimens are then formed by pouring the homogenised mixture into moulds with the help of a steel spatula. Tamping should be the minimum essential and the moulds used are of varnished wood, all with a view to preventing absorption of water by the mixture which is subjected to hardening.

The test specimens are kept under ambient conditions for 24 hours and are then carefully removed from the moulds.

In particular, cylindrical specimens are prepared, 5 mm. high and 50 mm. in diameter, for compression strength tests.

After being taken out of the moulds, the specimens are subjected to conditioning in three different ambients:

At ambient temperature and humidity;
At ambient temperature and humidity and immersed daily for 60 secs. in water at 20° C.;
Immersed in water at 20° C.

Compression strength tests are then carried out on the samples after 2, 7 and 28 days of treatment under the various conditions described.

In particular, compression strength is determined on cylindrical samples at a velocity of 5 mm./min.

In all tests, the hydraulic binder used is a cement known as Portland 325.

EXAMPLE 1

An aqueous dispersion is prepared using 88.3% water, 0.1% tensioactive media, 9.3% polyepoxide and 2.3% hardener, all percentages being by weight. The tensioactive media consist of a mixture of sodium lauryl sulphonate (18%), the product of condensation of nonyl phenyl with 30 mols ethylene oxide (62%) and the product of condensation of nonylphenol with 6 mols ethylene oxide (20%).

The polyepoxide consists of the product of condensation of epichlorohydrin and bisphenol with an epoxide equivalent of 180–210 and a viscosity of 9,000 to 13,000 cps.

The polyepoxide hardener consists of the adduct of phenylglycidylether and tetraethylenepentamine.

In this test, expanded polystyrene was used in the form of beads of 1 to 2.5 mm. diameter and with a bulk density of 16 kg./cu. m.

This polystyrene is treated with the aqueous solution of the glue and in particularly 1.94 parts by weight of dispersion are used for every part by weight of polystyrene. The polystyrene thus treated is homogenised with a water-cement mixture resulting in a final mixture consisting of cement (69.6% by weight), water (23.9% by weight), expanded polystyrene and glue dispersion (6.5% by weight).

This mixture is poured into the moulds and finally the specifications of the hardened products are ascertained, the density being equal to approx. 0.8 kg./cu. dm., as described in the text.

The results are summarised in Table 1.

TABLE 1

| Compression strength, kg./sq. cm. | A | B | C |
|---|---|---|---|
| After: | | | |
| 2 days | 8.0 | 6.8 | 9.2 |
| 7 days | 10.0 | 9.5 | 11.4 |
| 28 days | 11.7 | 11.4 | 12.5 |

It should be noted that, in Table 1, under A, are set out the results of tests conducted on samples kept in ambient conditions, while column B shows the results of samples maintained in ambient conditions and immersed for 60 seconds every day in water at 20° C., while column C shows the results with samples kept immersed in water at 20° C.

This arrangement is also maintained in the following tables.

EXAMPLE 2

The same procedure is adopted as in Example 1, an aqueous dispersion being used consisting of:

Water (82.2%), xylene (8.1%), polyepoxide (3.1%), monoepoxide (4.6%), hardener (1.9%) and tensioactive media (0.1%).

The percentages are given by weight. The polyepoxide is that described in the first example while the monoepoxide consists of butyl glycidyl ether.

The hardener and the tensioactive media are those desribed in the first example.

The polystyrene beads of 1 to 2.5 mm. diameter and with a bulk density of 16 kg./cu. m., are reacted with the dispersion.

The particular, 2.11 parts by weight of the dispersion are used to every part by weight of polystyrene.

The polystyrene which is thus treated is homogenised with a water/cement mixture which produces a final mixture consisting of: cement (69.4% by weight), water (23.8% by weight), expanded polystyrene and dispersion of glue and organic solvent (6.8% by weight).

This mixture is poured into the moulds and finally the characteristics of the hardened products are recorded, showing a density equal to approximately 0.8 kg./cu. dm., as described in the text.

The results are described in Table 2.

TABLE 2

| Compression strength, kg./sq. cm. | A | B | C |
|---|---|---|---|
| After: | | | |
| 2 days | 15.0 | 14.5 | 15.5 |
| 7 days | 19.0 | 19.6 | 18.5 |
| 28 days | 22.5 | 22.6 | 24.0 |

EXAMPLE 3

In this example, the expanded polystyrene particles of the type used in the previous examples are treated with the latex of a styrene-butylacrylate copolymer to the following specification:

Dry percent by weight: 43
Ford viscosity cup diameter 4, at 20° C.: 10+20 seconds
pH at 25° C.: 6.5.

More precisely, an emulsion is prepared which consists of vinyl latex (60.6% by weight), the solvent known commercially as Solvesso 100 (24.6% by weight), water (14.8% by weight). 1.74 parts by weight of such emulsion for every part by weight of expanded polystyrene is used in the treatment of the polystyrene.

Finally, the mixture is homogenised with a water-cement blend and a mixture results which consists of cement (68.6% by weight), water (25.4% by weight), polystyrene and vinyl emulsion (6% by weight).

By proceeding as in the previous examples, the results set out in Table 3 were obtained.

TABLE 3

| Compression strength kg./sq. cm. | A | B | C |
|---|---|---|---|
| After: | | | |
| 2 days | 12.1 | 13.0 | 13.5 |
| 7 days | 18.2 | 17.3 | 16.9 |
| 28 days | 23 | 24.1 | 24.6 |

EXAMPLE 4

In this test, a polystyrene in bead form was used, with a bulk density of 18 kg./cu. m., having the following granulometry expressed as a residue on a screen with a net mesh size of (in mm.):

| | Percent |
|---|---|
| 5 | 0 |
| 2.83 | 5 |
| 2 | 20 |
| 1 | 45 |
| Fines | 30 |

A mixture is prepared consisting of cement (73% by weight), water (25% by weight) and the latex described in Example 3 (2% by weight).

An aqueous dispersion is also prepared consisting of: water (75.1%), polyepoxide described in the first example (5.6%), butylglycidyl ether (8.3%), hardener (3.5%), xylene (7.3%), tensioactive media (0.2%).

The percentages are given by weight while the hardener for the epoxy compounds and the tensioactive media are those described in the preceding examples.

This dispersion is used to impregnate the polystyrene which has the characteristics described and in particular approximately one part by weight of dispersion is used for every part by weight of the polystyrene.

Finally, the mixture comprising the cement is homogenized with the mixture comprising the polystyrene, by blending 19.1 parts by weight of the mixture to every part by weight of the mixture.

The resultant mixture is hardened in the production of products with a density equal to approximately 0.8 kg./cu. dm., by proceeding as described in the text.

The characteristic features of the hardened products are set out in Table 4.

TABLE 4

| Compression strength, kg./sq. cm. | A | B | C |
|---|---|---|---|
| After: | | | |
| 2 days | 36.3 | 35.8 | 35.7 |
| 7 days | 39.3 | 39.6 | 38.9 |
| 28 days | 52.2 | 53.1 | 53.5 |

EXAMPLE 5

Exactly the same procedure is adopted as in Example 4, the quantities of polyepoxide, monoepoxide and hardener being halved. The results are summarised in Table 5.

TABLE 5

| Compression strength, kg./sq. cm. | A | B | C |
|---|---|---|---|
| After: | | | |
| 3 days | 35.1 | 32.3 | 31.4 |
| 7 days | 37.5 | 38.7 | 42.2 |
| 28 days | 50.1 | 51.2 | 51.7 |

What we claim is:

1. A method of producing lightweight building elements having a density of 0.2 to 0.8 kg./cu. dm., by the hardening of mixtures comprising hydraulic cement, water and granular expanded polystyrene, comprising forming a mixture of hydraulic cement, water and from about 1% to about 5% by weight, based on the weight of the hydraulic cement of a latex of a vinyl resin selected from the group consisting of polyvinyl acetate, copolymers of vinyl acetate with esters of acrylic or methacrylic acids, copolymers of styrene with esters of acrylic or methacrylic acids or mixtures thereof, the latex having a solids content of from about 40 to about 55% by weight, wherein the mixture is homogenized with the granular expanded polystyrene which has been previously treated with an aqueous dispersion comprising a polyepoxide resin glue, an organic solvent and a hardener for the polyepoxide resin glue, and in that the resultant homogenized mixture is hardened.

2. A method according to claim 1, characterised in that in the mixture consisting of water, cement and vinyl resin latex, rations by weight of water:cement of 0.4:1 to 0.5:1 are used.

3. A method according to claim 1, characterised in that expanded polystyrene is used in the form of granules of a diameter up to 3 mm. with closed cells, with an apparent bulk density of 16 to 28 kg./cu. m.

4. A method according to claim 1, characterized in that the expanded granular polystyrene is treated with 1 to 8 kg. for every cu. m. of granular expanded polystyrene of liquid polyepoxide resin glue dispersed in water, the glue consisting of a polyepoxide compound with an epoxy equivalent of 180 to 220 and a viscosity of 6,000 to 23,000 cps. and a monoepoxide compound chosen from the class consisting of the alkyl glycidyl ethers and aryl glycidyl ethers, the proportion by weight of polyepoxide compound to monoepoxide compound ranging from 0.3:1 to 1:1.

5. A method according to claim 1, characterized in that the aqueous dispersion of the polyepoxide resin glue contains an organic solvent selected from the class consisting of aliphatic or aromatic hydrocarbons.

6. A method according to claim 5, characterized in that the said solvent is used in quantities of 0.1 to 4 kg. for every cu. m. of polystyrene particles.

7. A method according to claim 1, characterized in that the aqueous dispersion of the polyepoxide resin glue contains a hardener for the epoxy glue, the said hardener being chosen from the group consisting of menthanediamine, triethylenetetramine and adducts based on phenylglycidylethers and tetraethylenepentamine.

8. A method according to claim 7, characterised in that the hardener is used in quantities of 10 to 30 parts by weight for every 100 parts by weight of epoxide compounds.

9. A method according to claim 5 characterized in that the organic solvent is selected from the class consisting of benzene, toluene and xylenes.

10. A method according to claim 1 characterized in that the latex comprises a copolymer of styrene with the esters of acrylic or methacrylic acids.

References Cited

UNITED STATES PATENTS

| | | | |
|---|---|---|---|
| 3,198,758 | 8/1965 | Donnelly | 260—2.5 EP |
| 3,272,765 | 9/1966 | Sefton | 260—2.5 B |
| 3,251,916 | 5/1966 | Newnham et al. | 260—2.5 B |
| 2,806,509 | 9/1957 | Bozzacco et al. | 260—2.5 B |
| 2,958,905 | 11/1960 | Newberg et al. | 260—2.5 B |
| 2,959,508 | 11/1960 | Graham et al. | 260—2.5 B |

SAMUEL H. BLECH, Primary Examiner

M. FOELAK, Assistant Examiner

U.S. Cl. X.R.

260—29.6 S, 30.4 EP, 33.6 EP, 33.6 UA, 837